(12) United States Patent
Rekaya et al.

(10) Patent No.: US 12,640,832 B2
(45) Date of Patent: May 26, 2026

(54) I/Q CODING METHOD FOR SDM COMMUNICATION SYSTEM OVER OPTICAL FIBRE

(71) Applicant: MIMOPT TECHNOLOGY, Paris (FR)

(72) Inventors: Ghaya Rekaya, Antony (FR); Akram Abouseif, Paris (FR)

(73) Assignee: MIMOPT TECHNOLOGY, Paris (FR)

( * ) Notice: Subject to any disclaimer, the term of this patent is extended or adjusted under 35 U.S.C. 154(b) by 288 days.

(21) Appl. No.: 18/685,198

(22) PCT Filed: Aug. 19, 2022

(86) PCT No.: PCT/FR2022/051590

§ 371 (c)(1),
(2) Date: Feb. 20, 2024

(87) PCT Pub. No.: WO2023/021261

PCT Pub. Date: Feb. 23, 2023

(65) Prior Publication Data

US 2024/0348361 A1     Oct. 17, 2024

(30) Foreign Application Priority Data

Aug. 20, 2021     (FR) ..................................... 2108805

(51) Int. Cl.
| | |
|---|---|
| *H04J 14/00* | (2006.01) |
| *H04J 14/04* | (2006.01) |
| *H04J 14/06* | (2006.01) |

(52) U.S. Cl.
CPC .............. *H04J 14/05* (2023.08); *H04J 14/04* (2013.01); *H04J 14/052* (2023.08); *H04J 14/06* (2013.01)

(58) Field of Classification Search
None
See application file for complete search history.

(56) References Cited

FOREIGN PATENT DOCUMENTS

WO     WO-2016145493 A1 * 9/2016 ......... H04B 10/5053

OTHER PUBLICATIONS

Chen Zhu et al "Improved polarization dependent loss tolerance for polarization multiplexed coherent optical systems by polarization pairwise coding", Optics Express, vol. 23, No. 21, Oct. 9, 2015, pp. 27434-27447.

(Continued)

*Primary Examiner* — David W Lambert

(57) ABSTRACT

The present invention relates to a method for dual-polarisation SDM transmission over optical fibre. The transmission method uses specific I/Q coding for combating the effects of PDL. The modulation symbols to be transmitted on the 2N polarisation states of the N wavelengths are broken down into real values and imaginary values (220). A first orthogonal linear transformation (230-1) is applied to the vector of the real values thus obtained and a second orthogonal linear transformation (230-2), separate from the first, is applied to the vector of the imaginary values thus obtained. A complex scalar solving an irreducible polynome of $\mathbb{R}[X]$ in $\mathbb{R}$ is multiplied with the first or second transformed vector before the two transformed vectors are summed (240) in order to provide a vector of transmission symbols for modulating the different states of polarisation of the spatial elementary channels.

10 Claims, 6 Drawing Sheets

(56)  References Cited

OTHER PUBLICATIONS

Akram Abouseif "Emerging DSP techniques for multi-core fiber transmission systems", Networking and Internet Architecture, Institut Polytechnique de Paris, 2020, NNT: 2020IPPAT013.tel-03101838.
El Mehdi Amhoud "Coding techniques for space-division multiplexed optical fiber systems", Networking and Internet Architecture, Télécom ParisTech, 2017, NNT: 2017ENST0067.tel-03412785.
Chen Zhu et al "Pairwise Coding to Mitigate Polarization Dependent Loss", 2015.
International Search Report dated Dec. 8, 2022 for International Application No. PCT/FR2022/051590.
Zhu Chen et al. "Subband Pairwise Coding for Robust Nyquist-WDM Superchannel Transmission" Journal of lightwave technology, IEEE, vol. 34, No. 8, Apr. 15, 2016, pp. 1746-1753, DOI: 10.1109/JLT.2015/2510362, ISSN:0733-8724.

* cited by examiner

I/Q CODING METHOD FOR SDM COMMUNICATION SYSTEM OVER OPTICAL FIBRE

CROSS-REFERENCE TO RELATED APPLICATION

This application is a national stage application, filed under 35 U.S.C. § 371, of International Patent Application No. PCT/FR2022/051590, filed on Aug. 19, 2022, which claims the priority to French application No. FR2108805 filed Aug. 20, 2021, which is incorporated by reference herein in its entirety.

TECHNICAL FIELD

The present invention relates to the field of optical fiber communications and more particularly spatial multiplexing or SDM (Spatial Division Multiplexing) communications.

Prior Art

The progress made in recent years in reducing attenuation in single-mode optical fibers has enabled them to almost reach their theoretical transmission capacities. Spatial multiplexing (SDM) optical communication systems based on multi-mode and/or multi-core optical fibers (or even bundles of single-mode fibers with reduced gain thickness, subsequently assimilated to multi-core optical fibers) make it possible to overcome this limit by taking advantage of spatial multiplexing between different modes and/or between different cores of an optical fiber.

The use of high modulation orders as well as multiplexing on orthogonal polarizations have made it possible to further increase the capacity of these SDM communication systems, but this progress now comes up against various limitations.

First of all, increasing the number of modes/cores leads to an increase in the level of interference between the elementary channels associated with the different modes/cores.

Then, different dispersion phenomena such as mode dispersion or MDL (Mode Dispersion Loss), polarization dispersion or PMD (Polarization Mode Dispersion) and polarization-dependent attenuation or PDL (Polarization Dependent Loss) increase the error rate (BER) in the different channels. However, if the effects due to MDL, CDL and PMD can be compensated digitally at reception, those due to PDL cannot be due to its non-unitary nature, which degrades the performance of WDM transmission systems in terms of BER depending on the bit rate, and therefore on transmission capacity.

It was proposed in Akram Abouseif's thesis entitled "Emerging DSP techniques for multi-core fiber transmission systems", published in 2015, to use spatio-temporal coding techniques to fight the degradation of capacity of transmission due to the CDL. However, these coding techniques complicate the transmitter and the receiver since the block of information symbols to be transmitted is coded over several successive transmission intervals or TTIs (Time Transmission Intervals) and, more generally, over several channel uses or CUs (Channel Uses).

Similarly, it was proposed in the thesis of El Mehdi Amhoud et al. entitled "Coding Techniques for Spatial Multiplexing on Fiber Optic Systems", 2018, to use space-time coding techniques to fight transmission capacity degradation due to MDL.

A precoding method on orthogonal polarizations to fight the reduction in capacity due to PDL was described in the article by C. Zhu et al. entitled«Improved polarization dependent loss tolerance for polarization multiplexed coherent optical systems by polarization pairwise coding»published in J. Lightwave Technology, vol. 34 no. 8, pages 1746-1753, 2016.

This method of precoding on orthogonal polarizations was illustrated schematically in FIG. 1.

The information symbols (binary words) to be transmitted are converted into symbols of a modulation constellation in the q-ary symbol modulators 110-1 and 110-2. The obtained modulation symbols, $x_1$, $x_2$ are then submitted to a rotation of angle $\theta$ in the complex plane using respective rotation modules 120-1 et 120-2 to obtain rotated symbols, $$x_1^\theta, x_2^\theta.$$

The real part of the first rotated symbol and the real part of the second rotated symbol are combined in 130-1 to provide a first emission symbol, $$\tilde{x}_1 = R(x_1^\theta) + jR(x_2^\theta),$$

carried by a first polarization component (for example a first horizontal polarization state). Similarly, the imaginary part of the first rotated symbol and the imaginary part of the second rotated symbol are combined in 130-2 to provide a second emission symbol $$\tilde{x}_2 = \Im(x_1^\theta) + j\Im(x_2^\theta),$$

carried by a second polarization component, of polarization orthogonal to the first one (for example a vertical polarization state).

The light signal whose orthogonal polarization components have been respectively modulated by the emission symbols $X_1$, $X_2$ is then transmitted over the optical fiber.

The precoding method described in this article, however, only applies to transmission system on monomode/mono-core optical fibre, and not to a SDM optical communication system.

An object of the present invention is therefore to propose a SDM transmission method over optical fiber (multimode and/or multicore) which makes it possible to achieve high transmission capacities despite the PDL and the interference between spatial elementary channels (interferences between various modes and/or various cores) while requiring only one use of transmission channel to transmit a block of information symbols.

SUMMARY OF THE INVENTION

The present invention is defined by a SDM_transmission method over optical fiber with polarization duality, intended to transmit, during one channel use, symbols belonging to a modulation constellation in the complex plane, being the number of spatial elementary channels used for transmission, said method being original in that:

said symbols undergo a separation into real part and imaginary part to provide a first vector consisting of the real parts of these symbols and a second vector consisting of the imaginary parts of these same symbols;

a first orthogonal linear transformation is applied to the first vector to provide a first transformed vector;

a second orthogonal linear transformation, distinct from the first, is applied to the second vector to provide a second transformed vector;

a complex scalar, solution of an irreducible polynome from $\mathbb{R}[X]$ to $\mathbb{R}$ is multiplied to the first or to the second transformed vector, before the two transformed vectors are summed to provide a vector consisting of complex emission symbols, each complex transmission symbol modulating a first and a second polarization states of a spatial elementary channel.

According to a preferred embodiment, the first linear transformation is the composition of a first rotation with a first non-trivial permutation and/or a first non-trivial reflection in $\mathbb{R}^{2N}$ and that the second linear transformation is the composition of a second rotation with a second non-trivial permutation and/or a second non-trivial reflection in $\mathbb{R}^{2N}$. The first permutation can be composed of an even plurality of transpositions and the second permutation may then be composed of an odd plurality of transpositions, or vice versa.

For example, the first rotation and the second rotation are identical.

According to an embodiment, the first orthogonal linear transformation is the identity.

Whatever the embodiment, the complex scalar, $\alpha$, such that $\alpha^{2N}$ is not a positive real.

For example, the complex scalar is equal to j with $j^2=-1$. In this case, the number N can be chosen odd with $N \geq 3$.

The elementary spatial channels can be propagation modes in the optical fiber.

When the optical fiber is of the multicore type, the spatial elementary channels can be made up of different cores of said fiber

BRIEF DESCRIPTION OF THE DRAWINGS

Other characteristics and advantages of the invention will appear on reading a preferred embodiment of the invention, described with reference to the attached figures including.

DETAILED DESCRIPTION OF SPECIFIC EMBODIMENTS

Figure 1:
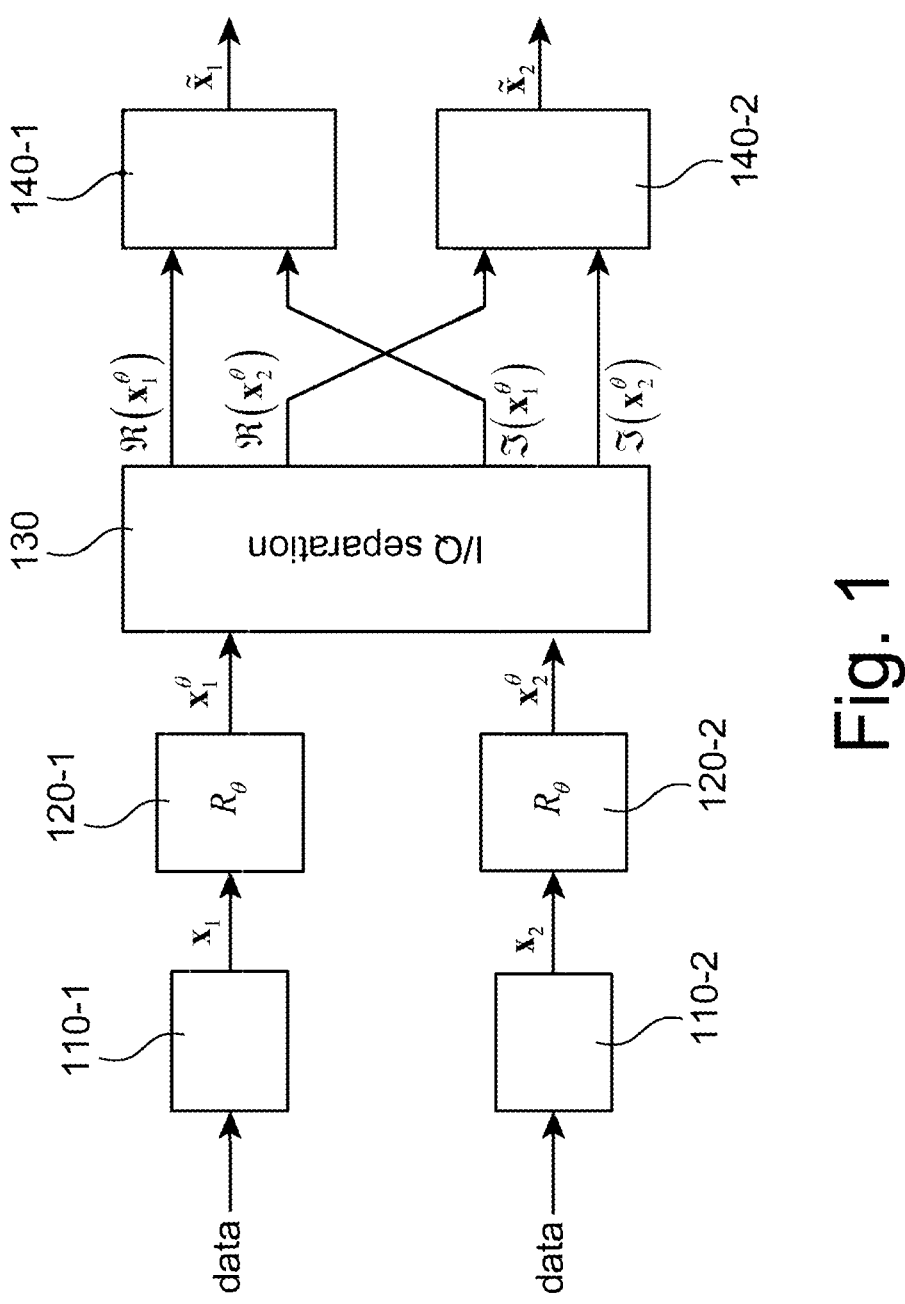
FIG. 1, already described, schematically represents an optical fiber transmission device using pre-coding on two orthogonal polarizations.

We will consider in the following a transmission system with spatial diversity (SDM) over optical fiber. Spatial diversity may be due to the plurality of modes and/or cores in the fiber. In the case of a classic multimode fiber, the diameter of the core is large enough to allow the propagation of several modes at the wavelength considered. In the case of a multi-core fiber, propagation takes place in a plurality of elementary cores of the fiber. The case of a bundle of single-mode fibers with reduced cladding thickness is compared below to a multi-core fiber.

The SDM transmission systems considered below can be of one and/or the other type, it being understood that the spatial elementary channels are then propagation modes and/or cores of an optical fiber.

We further assume that the optical fiber is classically affected by PDL attenuation, in other words that the different states of polarization in the fiber do not undergo the same attenuation. It is recalled that PDL attenuation is generally introduced by optical elements between fiber sections, in particular doped fiber optical amplifiers (EDFA) which create energy losses and fluctuations in optical signal to noise ratio or OSNR (Optical Signal to Noise Ratio). Abstraction will be made however of the polarization dispersion (PMD) as this effect can be effectively corrected by channel equalization in the DSP of the receiver.

The effect of PDL attenuation for a spatial elementary channel can be expressed by the $H_{PDL}$ matrix applied to the two polarization states:

$$H_{PDL} = D_\gamma R_\varphi B_\beta$$

where $$D_\gamma = \begin{pmatrix} \sqrt{1+\gamma} & 0 \\ 0 & \sqrt{1-\gamma} \end{pmatrix}$$

is the gain matrix, $$R_\varphi = \begin{pmatrix} \cos\varphi & -\sin\varphi \\ \sin\varphi & \cos\varphi \end{pmatrix}$$

is the polarisation rotation matrix and $$B_\beta = \begin{pmatrix} \exp(i\beta) & 0 \\ 0 & \exp(i\beta) \end{pmatrix}$$

is the birefringence matrix with $\gamma \in [0,1]$ defining the value of PDL PDL, $\Gamma_{dB}=\log_{10}(\Gamma)$, with $$\Gamma = \frac{1+\gamma}{1-\gamma}$$

and $\varphi, \beta \in [-\pi, \pi]$.

The SDM transmission system uses a plurality N of spatial elementary channels, each spatial elementary channel being associated with two polarization states. Thus, at each transmission instant, in other words at each use of the channel, the transmission system can transmit 2N modulation symbols, one symbol being transmitted per polarization state and per spatial elementary channel. The number N is generally chosen high, of the order of several tens or even more. In any case $N>1$ and, preferably, $N>2$.

The idea underlying the present invention is to separate the real parts and the imaginary parts of the different modulation symbols and to subject them to distinct orthogo-
nal linear transformations before recombining them in the
complex plane to then modulate the light signal with the
various spatial elementary channels/polarizations. We thus
carry out an averaging of the PDL attenuation over the
different polarization states and the different spatial elemen-
tary channels.

Figure 2:
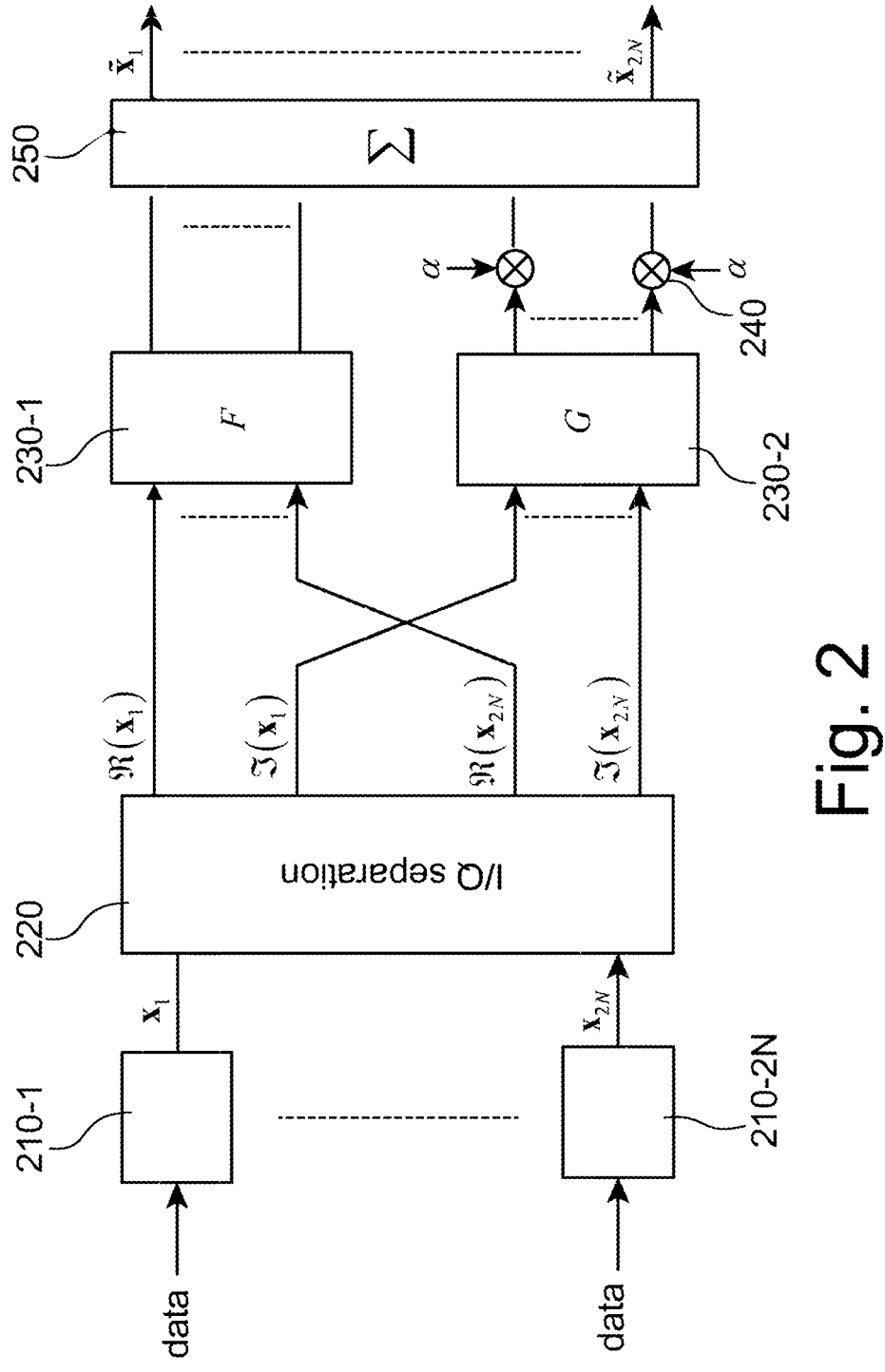
FIG. 2 schematically represents a SDM transmission device over optical fiber with IQ coding according to a general embodiment of the invention.

FIG. 2 schematically represents a SDM_transmission
device over optical fiber according to a general embodiment
of the invention.

The data to be transmitted at each transmission interval is
in the form of 2N information symbols, for example 2N
q-ary words with $q \leq \log_2 Q$ where Q is the cardinal of the
modulation alphabet. The modulation alphabet may in par-
ticular be a Q-QAM alphabet.

The information symbols may themselves result from
source coding and/or channel coding, in a manner known per
se.

In all cases, the 2N information symbols are respectively
converted into 2N modulation symbols in the q-ary symbol
modulators 210-1, . . . , 210-2N. The odd indices of these
symbols correspond to a first polarization state and the even
indices to a second polarization state, orthogonal to the first.
Each of these modulation symbols, denoted in the following
$x_1, \ldots, x_{2N}$, is then subjected to a decomposition into a real
part and an imaginary part in the separation module I/Q, 220.

The respective real parts of these modulation symbols
$\Re(x_1), \ldots, \Re(x_{2N})$ form a vector $X_R$ in $\mathbb{R}^{2N}$ which is
supplied to a first linear combination module 230-1. This
first module combines these real parts by means of a first
orthogonal linear transformation, F, represented by a matrix
$F \in O(2N, \mathbb{R})$, to provide a first transformed vector $\tilde{X}_R$, in
$\mathbb{R}^{2N}$.

Similarly, the imaginary parts of the modulation symbols
form a vector $X_I$ in $\mathbb{R}^{2N}$ which is supplied to a second linear
combination module, 230-2. This second module combines
these imaginary parts by means of a second orthogonal
linear transformation, G, represented by a matrix $G \in O(2N,
\mathbb{R})$, to provide a second transformed vector, $\tilde{X}_I$, in $\mathbb{R}^{2N}$.

The orthogonal linear transformations F and G are advan-
tageously chosen distinct. For example, one of them could
be a direct orthogonal linear transformation, in other words
the corresponding matrix will be an element of the special
orthogonal group $SO(2N, \mathbb{R})$, and the other will be an
indirect orthogonal linear transformation.

The second transformed vector is then multiplied in 240
by a complex scalar value $\alpha$, solution of a polynome of
$\mathbb{R}[X]$, irreducible in $\mathbb{R}$. Preferably, $\alpha$ will be chosen not to
be a norm of an element in the complex plane, in other words
$\alpha^{2N}$ should not be a positive real.

The first transformed vector and the second transformed
vector thus multiplied are finally summed in the adder 250
to provide a vector in $\mathbb{C}^{2N}$, $\tilde{X}$ whose complex elements
$\tilde{x}_1, \ldots, \tilde{x}_{2N}$ are transmission symbols respectively used to
modulate the 2N polarization states of the N spatial elemen-
tary channels. More precisely the component of a first
polarization state (for example a horizontal polarization
component) of a spatial elementary channel of index n will
be given by $\Re(\tilde{x}_n)$ and that of a second polarization state
(for example a vertical polarization component) of this
spatial elementary channel will be given by $\Im(\tilde{x}_n)$, or vice
versa.

Thus, the vector $\tilde{X}$ can be expressed, up to a multiplicative
coefficient, in the form:

$$\tilde{X} = FX_R + \alpha GX_I \qquad (1)$$

According to a variant not shown, the first transformed
vector is multiplied by the complex scalar value $\alpha$ in place
of the second transformed vector, the first transformed
vector thus multiplied being then summed with the second
transformed vector to provide the vector $\tilde{X}$.

Figure 3:
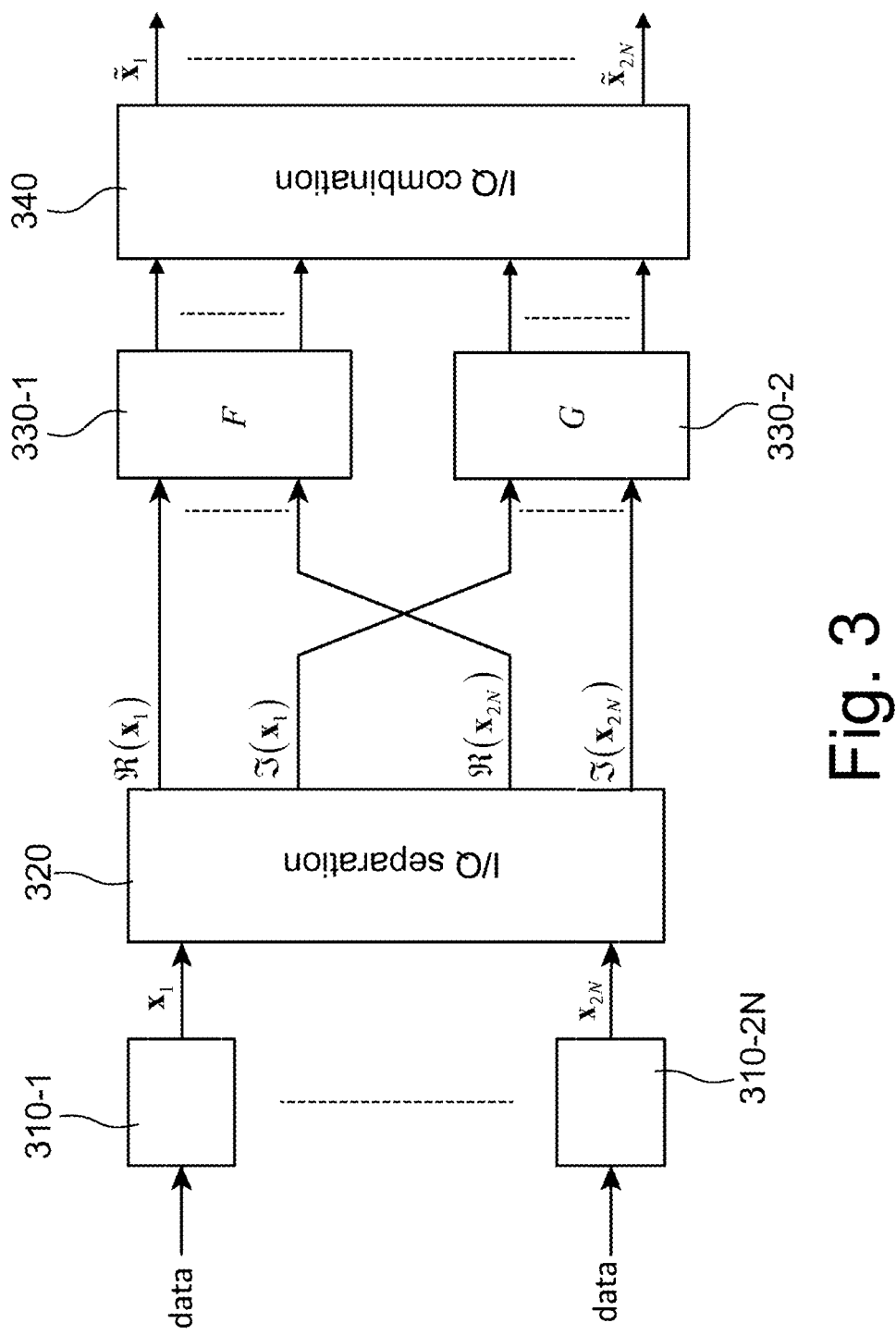
FIG. 3 schematically represents a SDM transmission device over optical fiber with IQ coding according to a preferred embodiment of the invention.

FIG. 3 schematically represents a SDM transmission
device on optical fiber according to a preferred embodiment
of the invention.

Modules 310-1, . . . , 310-2N, 320, 330-1 and 330-2
respectively fulfill the same functions here as modules
210-1, . . . , 210-2N, 220, 230-1 and 230-2 in FIG. 2.

Unlike the embodiment illustrated in FIG. 2, the first
transformed vector and the second transformed vector are
combined by the I/Q combination module, 340, to form the
complex vector $\tilde{X} = \tilde{X}_R + j\tilde{X}_I$ of $\mathbb{C}^{2N}$. In other words, this
embodiment is deduced as a special case from the general
embodiment with $\alpha = j$, the I/Q combination module here
replacing the multiplier 240 and the adder 250.

Advantageously, the complex scalar a is not a norm, in
other words N is chosen odd with $N \geq 3$.

The complex elements $\tilde{x}_1, \ldots, \tilde{x}_{2N}$ of the vector $\tilde{X}$ are
respectively used to modulate the 2N polarization states of
the N spatial elementary channels.

Figure 4:
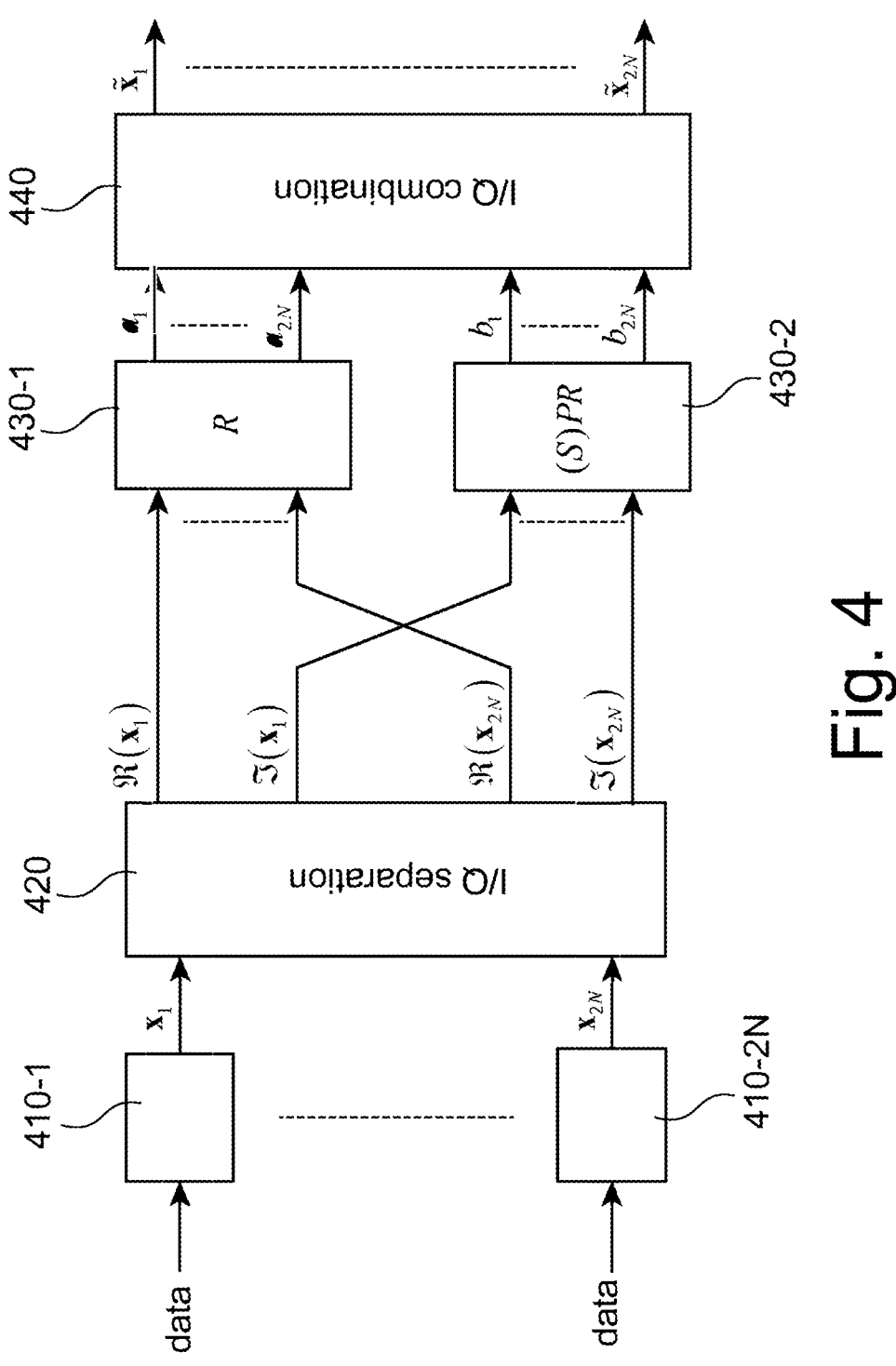
FIG. 4 schematically represents a SDM transmission device over optical fiber with IQ coding according to a first embodiment of the invention.

FIG. 4 schematically represents a SDM transmission
device over optical fiber with IQ coding according to a first
embodiment of the invention.

Modules 410-1, . . . , 410-2N, 420, 430-1, 430-2, 440
respectively perform the same functions as modules
310-1, . . . , 310-2N, 320, 330-1, 330-2 and 340 of FIG. 3.

This embodiment is a particular case of the preferred
embodiment of FIG. 3 in that the first linear transformation
is direct, that is to say a rotation R in space in $\mathbb{R}^{2N}$.

The second linear transformation results from the com-
position of this rotation R with a non-trivial permutation P
in $\mathbb{R}^{2N}$ and/or a non-trivial reflection S in $\mathbb{R}^{2N}$. By non-
trivial permutation, we mean a permutation distinct of
identity $I^{d}_{\mathbb{R}^{2N}}$, By non-trivial reflection, we mean a reflec-
tion distinct from $-I^{d}_{\mathbb{R}^{2N}}$.

The permutation can be composed of an even number of
transpositions in which case the second linear transforma-
tion is still a rotation, or it can be composed of an odd
number of such transpositions.

The permutation can be cyclic, the second linear trans-
formation then being represented by the matrix PR where
$P \in \{\Phi, \Phi^2, \ldots, \Phi^{2N-1}\}$ set of possible permutations (except
the trivial permutation) and where $\Phi$ is the cyclic permuta-
tion matrix defined by:

$$\Phi = \begin{pmatrix} 0 & 1 & 0 & \ldots & 0 \\ 0 & 0 & 1 & \ldots & 0 \\ \vdots & & \ddots & \ddots & \vdots \\ 0 & 0 & \ldots & 0 & 1 \\ 1 & 0 & \ldots & 0 & 0 \end{pmatrix}$$

As in the general case, the roles first and second linear
transformations can be interchanged. In other words, the
rotation R can be applied to the vector of imaginary parts $X_I$
and the compound of rotation and permutation and/or reflec-
tion (S)PR/S(P)R can be applied to the vector of real parts
$X_R$.

Figure 5:
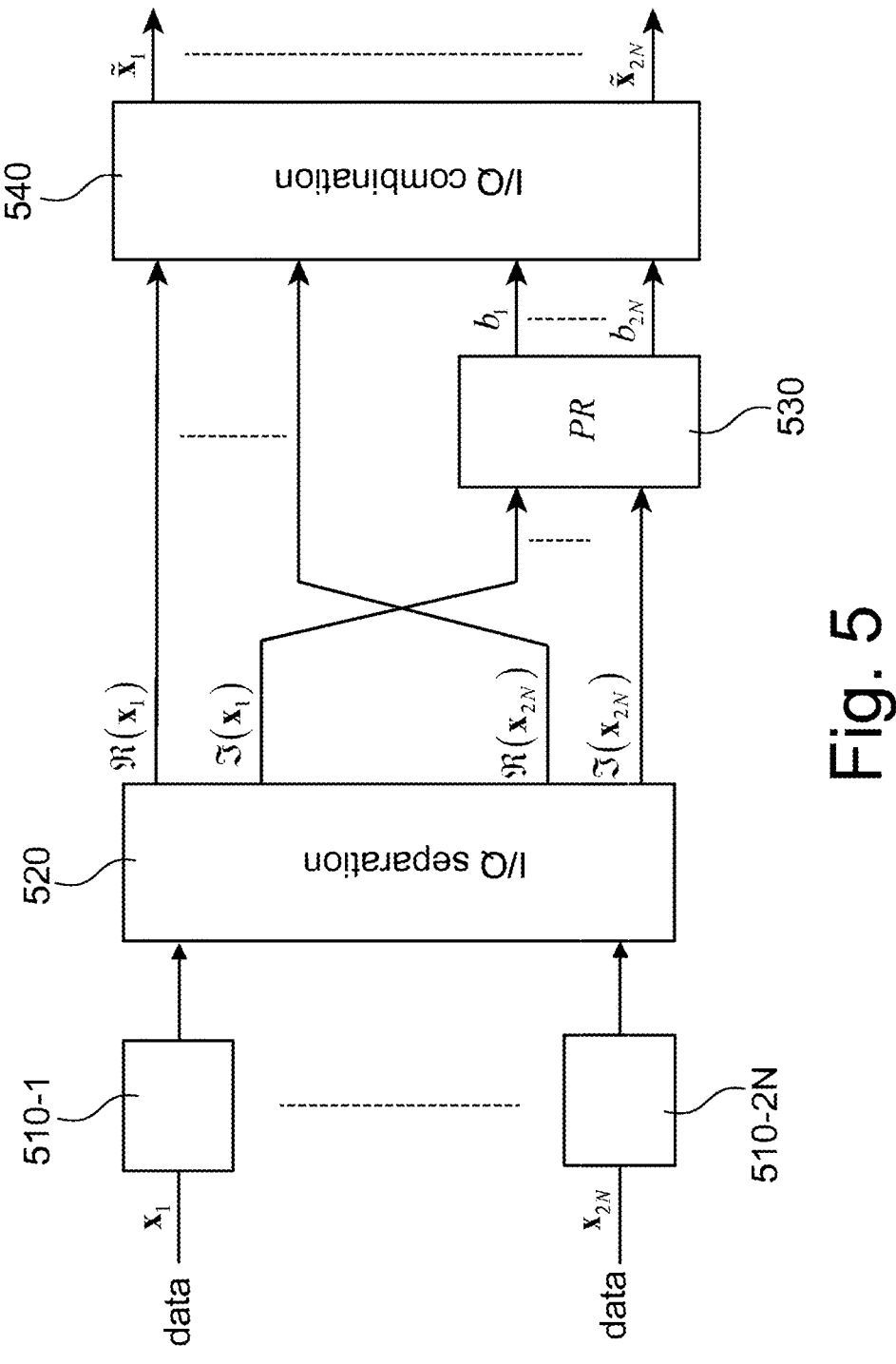
FIG. 5 schematically represents a SDM transmission device over optical fiber with IQ coding according to a second embodiment of the invention.

FIG. 5 schematically represents a SDM transmission device over optical fiber with IQ coding according to a second embodiment of the invention.

Modules 510-1, . . . , 510-2N, 520, 530, 540 respectively perform the same functions as modules 310-1, . . . , 310-2N, 320, 530-2 and 540 in FIG. 3.

This exemplary embodiment is a particular case of the preferred embodiment of FIG. 3 in that the first linear transformation is trivial and equal to identity $I^d_{\mathbb{R}^{2N}}$, and that the second linear transformation results from the composition of this rotation R with a trivial or non-trivial permutation P in $\mathbb{R}^{2N}$. The first vector and the second transformed vector are here combined to form the complex vector $\tilde{X}$ of symbols intended to modulate the 2N polarization states as above.

In all cases, the received optical signal is spatially (per propagation mode and/or core) demultiplexed and per polarization state. The 2N×2N MIMO channel can be estimated, for example using an LS (Least Squares) algorithm from pilot symbols. The symbols transmitted by the transmission device can then be estimated using a MIMO decoder using an ML (Maximum Likelihood) estimate or more simply a ZF (Zero Forcing) estimate aimed at multiplying the signal received by the pseudo-inverse of the channel matrix, namely $\hat{\tilde{X}}=(H^H H)^{-1}H^H Y$ where $\hat{H}$ of size 2N×2N is the estimated matrix of the MIMO channel.

After separation of the real and imaginary parts of each of the components of $\hat{\tilde{X}}$ and formation of a first vector $\overline{X}_R$ consisting of the 2N real parts and of a second vector $\overline{X}_I$ consisting of the 2N imaginary parts, a first inverse orthogonal transformation $F^{-1}$ is applied to the first vector $\overline{X}_R$ and a second inverse orthogonal transformation $G^{-1}$ is applied to the second vector, multiplied by $\alpha^{-1}$, $\alpha^{-1}\overline{X}_I$. We can then estimate the real and imaginary parts of the modulation symbols from the components of the same rank of the vectors thus obtained.

Figure 6:
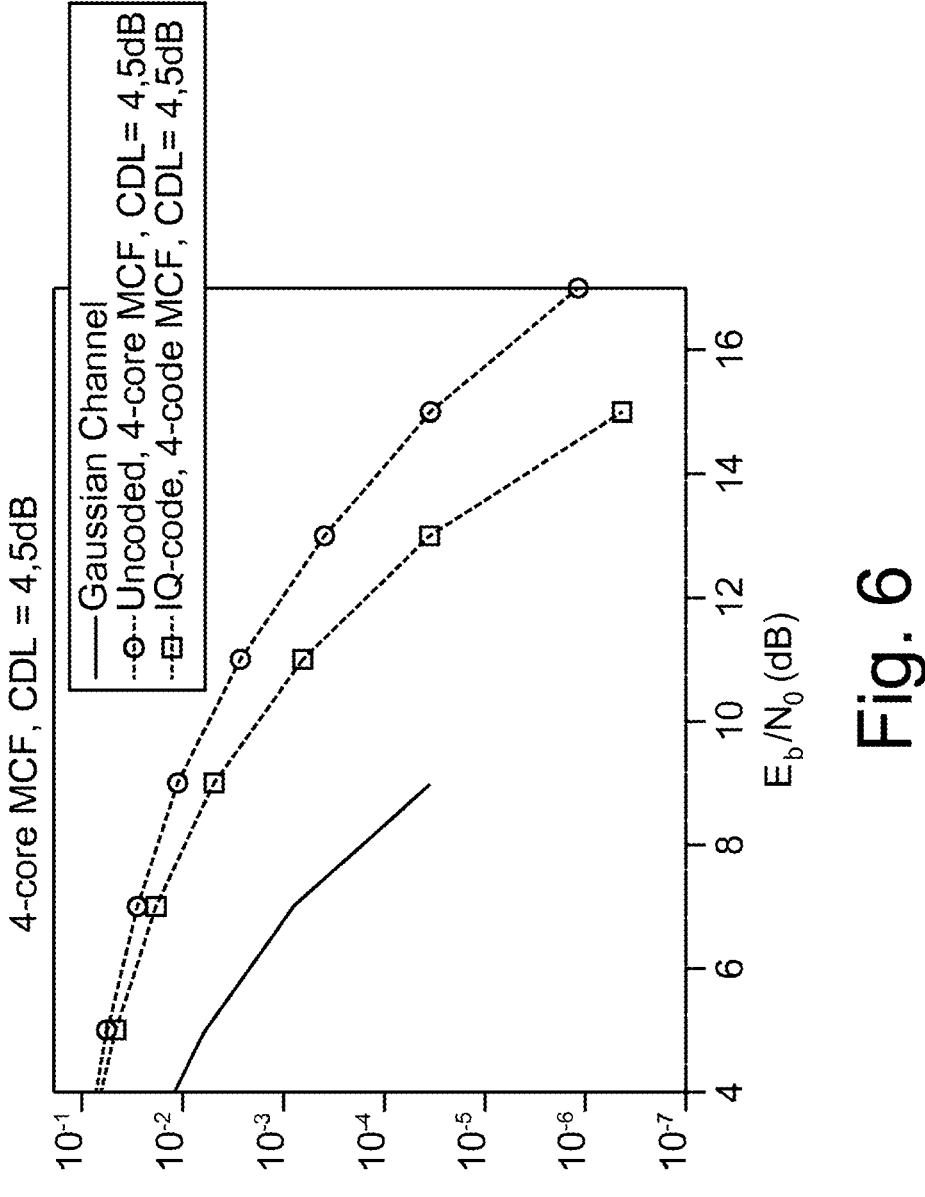
FIG. 6 shows an example of the gain provided by an SDM transmission device according to the invention.

FIG. 6 shows in an example the gain provided by a SDM transmission device according to the invention for N=4 spatial elementary channels, here elementary cores of a multi-core fiber (MCF).

The value of PDL, $\Gamma_{dB}$ was assumed to be the same for all spatial elementary channels and equal to 4.5 dB, the polarization rotation, $\phi$ was equal to $\pi/2$.

The optical fiber was made up of 10 sections of 100 km each, an optical amplifier with constant gain on the various modes being provided between consecutive sections. The symbol rate was 12 Gbauds and the modulation constellation was 16-QAM.

The chosen embodiment was that of FIG. 5 with $P=Id_{2N}$.

The estimate upon receipt was carried out using an ML estimator.

FIG. 6 gives the bit error rate (BER) as a function of the optical signal-to-noise ratio (OSNR) in the multicore fiber. In this case, we have $\alpha^{2N}=1$ but we nevertheless observe a gain (of OSNR) of more than 1 dB compared to a non-IQ coded SDM system.

The invention claimed is:

1. SDM transmission method over optical fiber with polarization duality, intended to transmit, during one channel use, 2N symbols belonging to a modulation constellation in the complex plane, N>1 being the number of spatial elementary channels used for transmission, characterized in that:

said symbols undergo a separation into real part and imaginary part (220-520) to provide a first vector consisting of the real parts of these symbols and a second vector consisting of the imaginary parts of these same symbols;

a first orthogonal linear transformation (230-1, . . . , 430-1) is applied to the first vector to provide a first transformed vector;

a second orthogonal linear transformation (230-2, . . . , 530-2), distinct from the first, is applied to the second vector to provide a second transformed vector;

a complex scalar, solution of an irreducible polynome from $\mathbb{R}[X]$ in $\mathbb{R}$ is multiplied to the first or to the second transformed vector, before the two transformed vectors are summed to provide a vector consisting of 2N complex emission symbols, each complex transmission symbol modulating a first state and a second polarization state of a spatial elementary channel.

2. SDM transmission method over optical fiber with polarization duality according to claim 1, characterized in that the first linear transformation is the composition of a first rotation with a first non-trivial permutation and/or a first non-trivial reflection in $\mathbb{R}^{2N}$ and that the second linear transformation is the composition of a second rotation with a second non-trivial permutation and/or a second non-trivial reflection in $\mathbb{R}^{2N}$.

3. SDM transmission method over optical fiber with polarization duality according to claim 2, characterized in that the first permutation is composed of an even plurality of transpositions and that the second permutation is composed of an odd plurality of transpositions, or vice versa.

4. SDM transmission method over optical fiber with polarization duality according to claim 3, characterized in that the first rotation and the second rotation are identical.

5. SDM transmission method over optical fiber with polarization duality according to claim 2, characterized in that the first orthogonal linear transformation is identity.

6. SDM transmission method over optical fiber with polarization duality according to claim 1, characterized in that the complex scalar, a is chosen such that $\alpha^{2N}$ is not a positive real.

7. SDM transmission method over optical fiber with polarization duality according to claim 5, characterized in that the complex scalar is equal to j with $j^2=-1$.

8. SDM transmission method over optical fiber with polarization duality according to claim 7, characterized in that the number N is odd with N≥3.

9. SDM transmission method over optical fiber with polarization duality according to claim 1, characterized in that the spatial elementary channels are propagation modes in the optical fiber.

10. SDM transmission method over optical fiber with polarization duality according to claim 1, characterized in that the optical fiber is of the multi-core type and that the elementary spatial channels are different cores of said fiber.

* * * * *